350-360

XR 3,946,433

United States
Kermisch

[11] 3,946,433
[45] Mar. 23, 1976

[54] PHASE IMAGE SCANNING METHOD

[75] Inventor: Dorian Kermisch, Penfield, N.Y.

[73] Assignee: Xerox Corporation, Stamford, Conn.

[22] Filed: Nov. 25, 1974

[21] Appl. No.: 526,875

[52] U.S. Cl. .................... 358/41; 178/7.1; 350/161
[51] Int. Cl.² ............................................ H04N 9/04
[58] Field of Search ............ 358/62, 41, 44, 55, 80; 350/161; 178/7.1, DIG. 27; 340/173 LT; 179/100.3 G, 100.3 V

[56] References Cited
UNITED STATES PATENTS

| | | | |
|---|---|---|---|
| 2,804,803 | 9/1957 | Edwards et al. | 358/44 X |
| 2,919,302 | 12/1959 | Glenn, Jr. | 358/62 |
| 3,048,655 | 8/1962 | Ellis | 350/161 X |
| 3,485,550 | 12/1969 | De Haller et al. | 350/161 |
| 3,647,945 | 3/1972 | Hannan | 358/44 X |

*Primary Examiner*—Robert L. Griffin
*Assistant Examiner*—Mitchell Saffian
*Attorney, Agent, or Firm*—James J. Ralabate; David C. Petre; John B. Mitchell

[57] ABSTRACT

A method of scanning a phase image and rapidly converting it into a video signal is disclosed. The phase image is scanned with collimated light such as from a laser and the diffracted light is detected by fixed detectors and converted into a video signal. In a preferred embodiment, multiple color encoded phase images of a full color original are simultaneously scanned, converted into video signals and electronically manipulated to effect real-time full color masking of the original.

42 Claims, 10 Drawing Figures

PHASE IMAGE SCANNING METHOD

BACKGROUND OF THE INVENTION

This invention relates generally to image scanning, and specifically to such systems which effect color masking.

Color copying has become increasingly important in recent years because of changes in public acceptance of, and demand for, color information. The pressures created by these demands have resulted in numerous technological advances in the color reproduction arts, among which is that set forth in the instant disclosure.

Due to the inability of readily available and economic dyes to adequately transmit colors, it is necessary that some compensation or color correction be made to reduce the amount of specific pigments in specific areas--a compensation which is most often accomplished by the process known as color masking. Many color masking techniques are known in the art as, for example, those described in *The Focal Encyclopedia of Photography*, Vol II, pp. 921–927, W. & J. Mackay & Co., Ltd., Chatham, England, 1965, or by Yule in *Principles of Color Reproduction*, John Wiley & Sons, Inc., New York, 1967. These techniques include the well-known photographic process of masking color separation negatives or positives, with other negatives or positives to vary the density of the specific color components.

Additional related techniques include the use of electronic color scanners which simultaneously or individually produce color separations. These devices scan the subject along very narrow lines using a small light beam and, through lenses and electronic gear obtain all of the information needed to separate colors and make such corrections as necessary. Many of these devices are known in the art, a brief summary of which is set forth by Yule, supra, pages 305–326.

The instant invention makes use of a broad class of imaging members which record optical images by an image-wise distribution of photo-generated voltages or current acting upon a voltage or current-alterable recording medium. Typically, in these members, image-wise activating radiation incident on a photoconductor allows charge carriers to move in an external electrical field. These charge carriers interact with a voltage or current-sensitive member which in turn modulates light in the form of a phase image.

U.S. Pat. No. 2,896,507, describes an imaging member which includes a photoconductive layer on an elastically deformable layer sandwiched between a pair of electrodes, one of which is a thin metallic layer overlying the deformable layer. In operation, imagewise activating radiation is directed upon the member and an electrical field is established across the photoconductive and deformable layers thus causing these layers to deform in image configuration. The member is described as being capable of functioning as an image intensifier since the deformation image may then be read out with a high intensity light source and a Schlieren-type optical system.

Recently, a major advance in the art was made by Sheridon who disclosed the Ruticon (derived from the Greek words "rutis" for wrinkle and "icon" for image) family of imaging members wherein the voltage-sensitive light-modulating recording medium comprises a deformable elastomer layer and a photoconductive material may be provided as a separate layer or incorporated in the elastomer layer. For a detailed description of the Ruticon devices, see *IEEE Transactions On Electron Devices*, Sept. 1972, and U.S. Pat. No. 3,716,359. Various different embodiment for establishing an electric field across the elastomer layer are described.

Referring now to FIG. 1, an exemplary imaging member from the Ruticon family is shown. Many modifications of the elements are known in the art, but generally imaging member 1 is comprised of a substrate 6 which is a transparent non-conductive layer having thereon a conductive transparent layer 5. Layer 4 is a photoconductive material which will allow the passage of more electrical charges into these regions which are exposed to light. Elastomer 3 may be of a class of elastomeric solid materials including both natural, such as natural rubbers and synthetic polymers which have rubber-like characteristics, i.e., elastic, and include material such as styrene-butadiene, polybutadiene, neoprene, butyl, polyisoprene nitrile and ethylene propylene rubbers.

A thin continuous conductive layer 2 is placed on the surface of the elastomer, and is flexible enough to follow the deformations of the elastomers. In a preferred embodiment, this layer is also highly reflective.

Power supply 7 provides D.C. voltages of one polarity to form a deformation image on the surface of the elastomer. The polarity required depends primarily on the nature of the photoconductor. Power supply 7 must be capable of being turned off to erase the image, or undergo a shift in polarity to more rapidly erase the image. Supply 7 may also be A.C. or a combination of an A.C. and D.C.. The external electrical circuit may also include suitable switching means (not shown). Also, not shown, is an optional floodlight which may facilitate erasure and an absorption-type line grating, usually positioned between the substrate and the photoconductive layer.

This layer of image recorder can be read out using Schlieren-type optics. The positive image will be produced by diffracted light (higher orders), and the negative image will be produced by the undiffracted light (zero order).

The above-described Sheridon patent and copending application to Bergen, described below, disclose several embodiments of electro-optical image recorders, several variations upon their useful application and several useful modifications of a color scheme. The instant invention employs these teachings in a novel fashion to achieve results comparable to prior art color masking techniques.

SUMMARY OF THE INVENTION

It is therefore an object of this invention to provide a novel method of scanning images.

It is a further object of this invention to provide a method of scanning color images using a one color laser.

It is a further object of this invention to provide a novel method of scanning phase images.

It is a further object of this invention to provide novel methods of converting phase images into video signals.

It is an even still further object of this invention to provide a novel color masking system which is both simple and sensitive, without the complexities of the prior art.

It is a still further object of this invention to provide a novel color masking system which employs specific characteristics of color electro-optic recorders.

Another object of this invention is to provide a novel color masking system which detects color components of an original and electronically recreates that image with color correction.

Another object of this invention is to provide a novel color masking system which requires only one laser and a color electro-optic image recorder.

Another object of this invention is to provide a method of simultaneously scanning multiple encoded phase images.

Another object of this invention is to provide a method of increasing the practical storage time of certain electro-optic image recorders.

These and other objects are accomplished by providing a method of scanning a phase (surface relief) image and rapidly converting it into a video signal. In a preferred embodiment, multiple color encoded phase images of a full color original are simultaneously scanned, converted into video signals and electronically manipulated to effect real-time full color masking of the original.

BRIEF DESCRIPTION OF THE DRAWINGS

The advantages of this invention will become apparent upon consideration of the following detailed disclosure of the invention, especially when taken on conjunction with the accompanying drawings wherein.

FIG.S 4A and B are schematic and isometric views of color gratings suitable for use with the instant invention.

Figure 5:
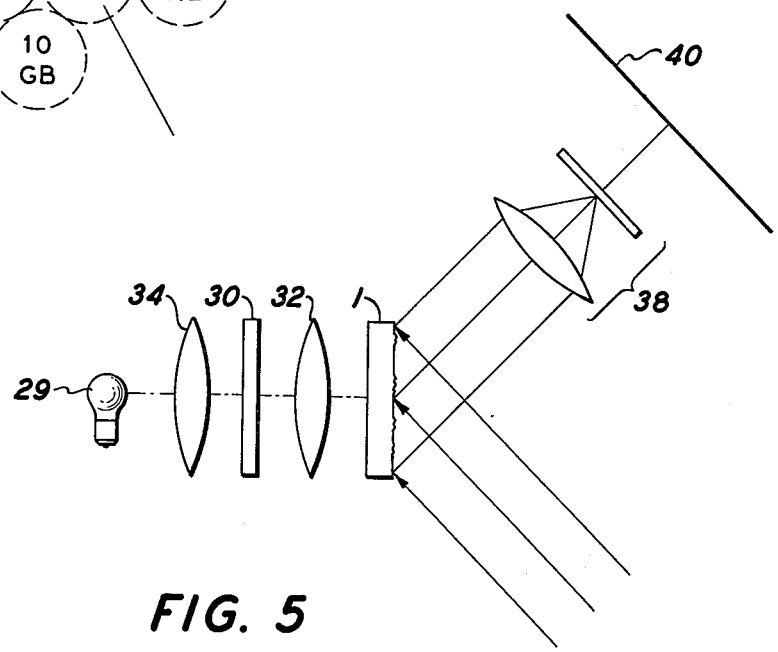

FIG. 5 is a partially schematic, cross-sectional view of a color imaging system.

Figure 6:
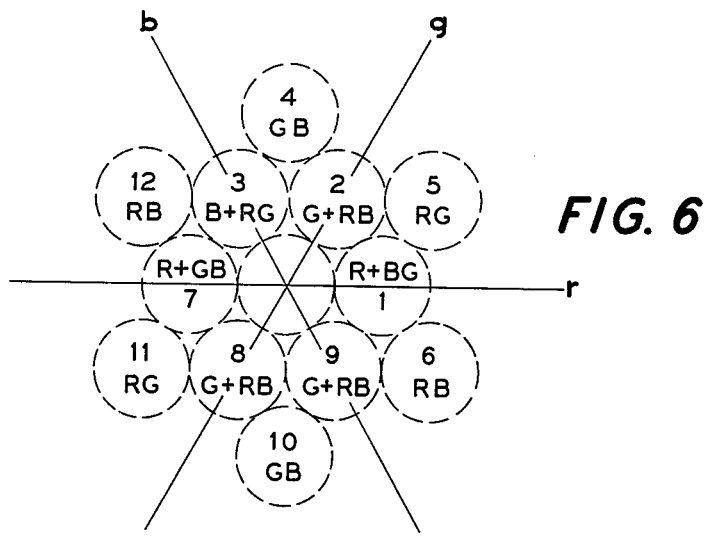

FIG. 6 is a schematic representation of part of the diffraction pattern as it appears in the Fourier plane.

Figure 7:
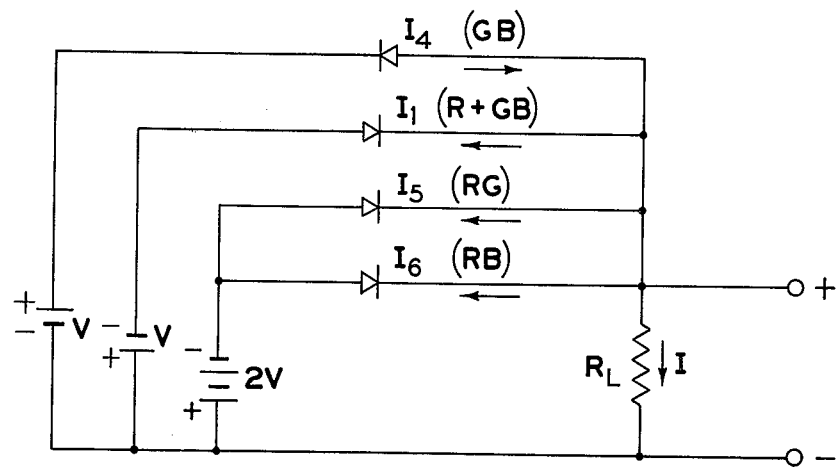

FIG. 7 is a schematic representation of an exemplary embodiment of addition and subtraction circuitry suitable for use with the instant invention.

Figure 8:
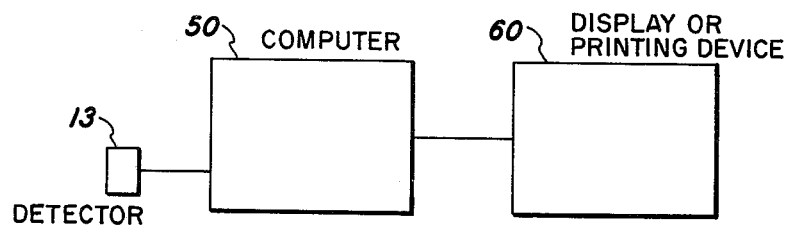

FIG. 8 is a block diagram of part of the inventive system.

Figure 9:
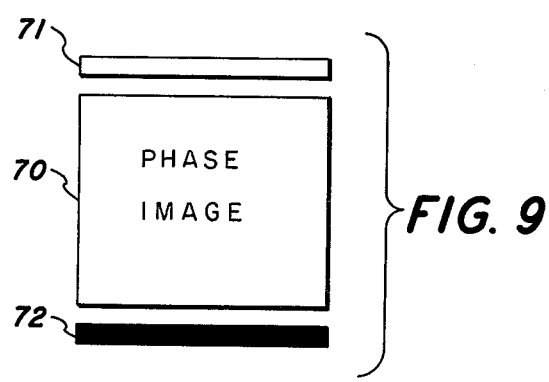

FIG. 9 is a schematic view of an apparatus which provides for the comparison of a generated signal with predetermined maximum and minimum signals to control a video amplifier.

DESCRIPTION OF THE PREFERRED EMBODIMENTS

An image scanning system most usually employs a detector to "read" the light reflected from the surface of the image; however, when a diffusely reflecting image is scanned by a laser beam, only a minute part of the scattered light reaches the detector. For any given gain-bandwidth product of the detector, the amount of light collected by the detector limits the scanning speed.

Figure 1:
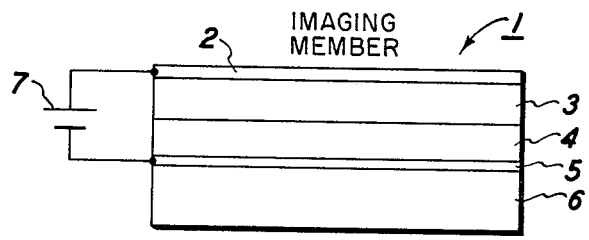
FIG. 1 is a partially schematic, cross-sectional view of an electro-optical image recorder suitable for use with the instant invention.

If the original image is converted into a phase (surface relief) image, as for example, by imaging it onto a Ruticon-type device like shown in FIG. 1, the advantages of the instant invention may be realized. The phase image is then scanned by a laser beam, and the diffracted light, which is specularly reflected, is detected by small fixed detectors. In this way, an appreciable fraction of the laser beam is collected by the detector, and the scanning speed is increased in comparison with the method in which the diffusely reflecting image is scanned directly.

Figure 2:
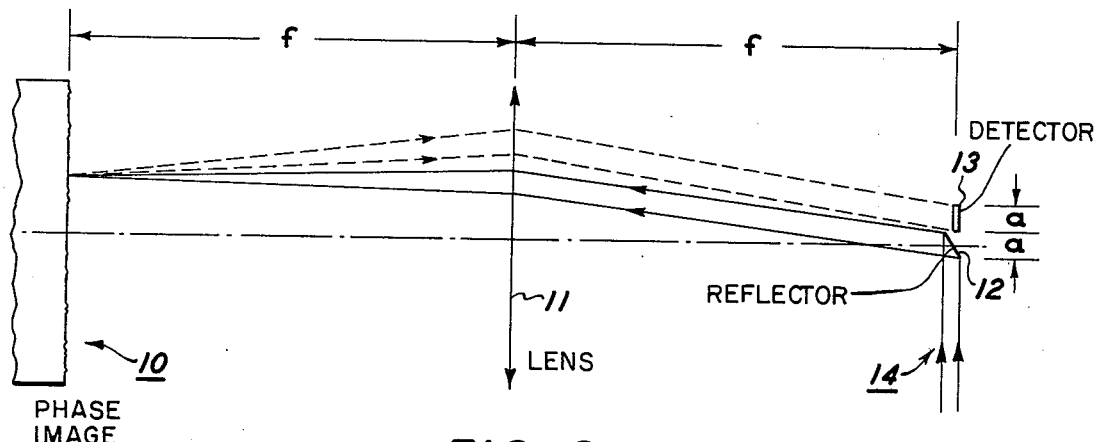
FIG. 2 is a schematic representation of a preferred embodiment of the system of the instant invention.

Referring now to FIG. 2, the basic elements of a preferred embodiment of the inventive system include a phase image 10, a lens 11 with focal length $f$, a reflector 12 and a detector 13. A collimated beam of light 14 from a source of collimated light, such as a laser or arc lamp (not shown) is deflected by the deflector 12 which is positioned on the optical axis of the lens 11, at the distance of one focal length from the lens. This position insures the important condition that the scanning beam is normal to the surface of the phase image 10.

Because the surface of the phase image is placed in the other focal plane of the lens 11, the collimated beam incident on the lens is focused on the image.

It should be understood that the phase images herein contemplated specularly reflect a majority of the incident readout light at certain predetermined angles to create a diffraction pattern at the Fourier plane. The pattern is characterized in that points, or spots, of light representing the diffracted orders appear in a symmetrical arrangement about the focal point or zero order reflected light. In a one grating system the diffracted orders are equally spaced from the focal point in the direction of the grating. See, for example, FIG. 2 wherein the distance is $a$, thereby providing a diffracted order at point $a$ and one at $-a$. In a multitple grating system, the patterns are repeated in the direction of each grating (see FIG. 6). Additionally, multiple grating systems exhibit cross-talk terms comprising components from each grating. Even though in practice when we have two or more gratings, one influences the other, which influence we call "cross-talk", we shall reserve the name "cross-talk terms" for those diffracted orders which appear because of the interaction of two diffraction gratings. We call "first order cross-talk terms" the directions of propagation which are obtained by the vector addition of the directions of propagation of two first order terms of two diffraction gratings.

Figure 3:
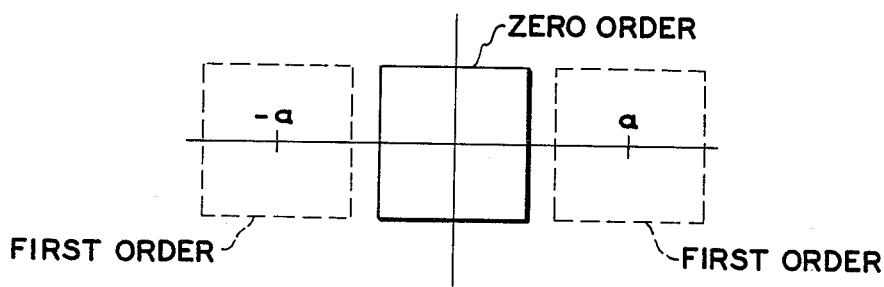
FIG. 3 is a schematic representation of some of the diffracted orders, and zero order, showing their relative locations for a deflector of a given size.

The zero order reflected light from the phase image retraces the path of the incident beam and illuminates the deflector 12. The diffracted first orders (two of which are shown in FIG. 2) produce in the focal plane of the lens two spots of light of equal form and size as the deflector projection on the focal plane. If the centers of these spots are at a distance $a$ from the optical axis, see FIG. 3, the requirement that the spots of light corresponding to the zero and first diffracted orders to not overlap, limits the size of the deflector, in the direction of the diffracted orders, to approximately $a$.

The diffracted orders thereby created are stationary on one plane. The basic principle is to position the deflector and the phase image in the opposite focal planes on one lens, and the phase image and the detector in the opposite focal planes of another, or the same, lens.

Of course, it should be obvious that the scan pattern is a two-directional movement, one vertical and one horizontal. The function of the detector and signal conversion and use will be explained below.

Furthermore, it should be understood that even higher order, i.e., above the first order, diffracted light spots do occur, but are relatively insignificant and are usually disregarded.

In the case where the local reflectivity of the phase image is varying, as with a Ruticon image recorder, a separate detector can be used to monitor the zero order. Zero order monitoring requires that the phase image be at a slight angle with the lens, thereby focusing that portion of the light away from the deflector 12. The angle would be as small as possible to minimize image distortion. Or, in the alternative, a beam splitter can be used which reflects part of the diffracted light in a different direction, away from deflector 12. If we denote by $I_1$ and $I_0$ the instantaneous video signal corresponding to one first diffracted order and the zero order respectively, the electronically produced ratio $I_1/I_0$ provides a measure of the diffraction efficiency of the original image, independent of the local reflectivity of the phase image.

The systems described above accomplish one color scanning, but may be easily modified to sequentially produce video signals representative of a multi-colored original. By using color separation filters between the original and the image recorder it is possible to scan sequentially the components of a color image. The multi-color original may then be recreated as desired.

In copending application Ser. No. 507,911, filed on Sept. 20, 1974, in the name of Richard F. Bergen, there is described a modification suitable for use with the above-described Sheridon image recorder which allows for the recording and display of full-color images. The entire disclosure of said Bergen application is hereby expressly incorporated herein by reference. By employing the color encoding techniques of this application, a full color masking system may be devised.

Figure 4A:
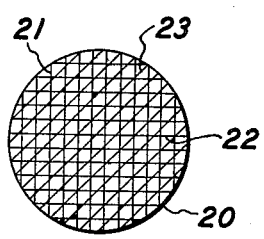

Basically, the color recording system of the Bergen application comprises any color recording device which will record screened optical input, and preferably is similar to that shown in FIG. 1 with the exception that the spatial light modulation means comprises a complex color grating in place of the absorption-type line grating. In one embodiment the spatial light modulation means comprise a plurality of differently colored gratings at different angular orientations superimposed on each other on a common substrate. Each different colored set of stripes has a periodicity which may be the same as, or different than, that of the other set(s) of stripes. In FIG. 4A, there is illustrated a complex color grating which includes three differently colored sets of stripes, (some of which are shown greatly magnified for purposes of illustration) for example, cyan, magenta, and yellow on a transparent substrate 20. As aforesaid, each different set of stripes is disposed at a different angular orientation, the cyan stripes 21 are shown in the vertical direction, the magenta stripes 22 are shown in the horizontal direction and the yellow stripes 23 are shown at an angle of 45° to the cyan and magents stripes. Of course, these angular orientations are meant to be illustrative only. The complex color grating shown in FIG. 4A may be affixed to the imaging member in any of the ways described in the copending Bergen application, for example, by adhering it to the surface of a fiber optic element with mechanical securing means and optionally disposing a layer of an index matching liquid in between.

In the full color scanning system herein described, it is highly desirable that the angles between the color gratings be 60°, whereby the screens are oriented at 0°, 60° and 120°. The advantages of this particular arrangement are many, but primarily concern the ability to individually detect the components shown in FIG. 6 and thereby perform the electronic computations to be described below.

Figure 4B:
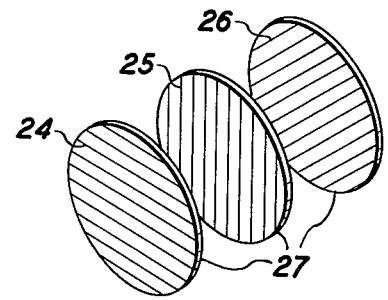

Alternatively, the imaging member may comprise a plurality of differently colored sets of stripes, at least one set of stripes residing on a different substrate than that upon which the other set(s) of stripes resides; or the color stripes may be formed directly on a surface of a fiber optic element. In FIG. 4B there is shown in exploded isometric view an embodiment of a color grating wherein a different set of stripes, for example, red 24, green 25 and blue 26 respectively, resides on a separate fiber optic element 27. By using three separate fiber optic elements in the manner described, it is possible to independently control the angular relationship of each color when the fiber optic elements are placed in contact with each other. Preferably, an index matching layer is formed at the contact interfaces between each fiber optic element. Additionally, it is possible to image the original onto the multiple-color screen, and then image both onto the electro-optical recorder.

A generalized color recording system of the Bergen-type is illustrated in FIG. 5 wherein a color transparency 30 is exposed with light from readin source 29 through lens 34. The light passing through the transparency is focused at the plane between the color grating and the fiber optic element and an image is formed on the surface of imaging member 1 in the manner previously described. The three-color grating of the imaging member converts the color image information into surface deformation phase gratings at three different orientations. The image is read out with light from a readout illumination system (not shown) which strikes the image surface of the imaging member. After processing the readout through readout system 38, the final color image may be viewed at image plane 40.

As explained in the above-described U.S. Patent to Sheridon and U.S. Patent application to Bergen, Ruticon imaging members can be made to store images and/or to display them in real-time. Furthermore, the image output sense can be either positive or negative, depending upon a simple change in Schlieren system geometry. These properties can be advantageously employed to produce a real-time color masking system which compensates for non-ideal inks or dyes. All of the embodiments and materials described in the Sheridon patent and Bergen application are suitable for use in this invention and are intended to be encompassed herein.

As explained above in relation to FIG. 5, the colors in the original 30 are separated by the color image recorder and divided into component parts. Each of the three components are directed in lines corresponding to the different colored filters shown in FIG. 4 and focused in discreet points at the Fourier plane representing different orders of diffracted light.

It is important here to note that only one readout laser is needed in the color embodiments. This may be any laser, but will usually be selected with cost factors in mind.

If the phase image of the FIG. 2 scanning system contains three different images, as explained above, the diffraction pattern at the focal plane of the lens will appear as shown in FIG. 6. Letting $I_n$ denote the video signal of the $n^{th}$ detector, as numbered in the figure, R, G and B the light intensity diffracted in the first orders by the cyan, magenta and yellow screens, respectively, and RG, RB and GB the light intensity of the "crosstalk" terms, it is evident from the figure than on detector 1, for example, the light intensity is R + GB. That is, the light intensity at detector 1 comprises a cyan component and a magenta-yellow component.

By positioning and monitoring detectors 4, 5 and 6, video signals may be obtained and electronically manipulated to create a composite video signal proportional to a given light composition. For example, the signal $I_R = I_1 - I_4$ is proportional to R (the first order diffracted light intensity of cyan). Moreover, for a one-screen phase image, R is proportional to $J_1^2(r)$, the Bessel function of the first order, where r is proportional to the amplitude of the surface deformation of the sinusoidal carrier which contains the red image information. In the case of a three-color screen, it can be shown that the composite signal $$I = I_1 - I_4 + 2I_5 + 2I_6$$

is approximately proportional to $J_1^2(r)$ for diffraction efficiencies of up to 10 percent. Desired composite signal may be obtained according to the above principles, by selectively combining the outputs of detectors 1 through 12.

Because the detectors are essentially current sources, their signals may be manipulated by the employment of conventional electronic techniques. For example, addition and subtraction to achieve the equation expressed immediately above may be done by passing the detector currents through a common load resistor as shown in FIG. 7. For practical reasons, to reduce noise and increase bandwidth it may be desirable to use additional analog circuits to achieve these results. It may also be desirable to detect both components of a diffracted order, 1 and 7, for example, to increase the signal to noise ratio.

As shown in FIG. 8, detectors 13, representative of all the detectors shown in FIG. 6, are aligned to received point color components of diffracted light representative of an original, produce electrical output signals descriptive of the intensity of light received and feed them to computer 50 which performs the manipulative commands which result in a color corrected image. The output of the computer 50 is fed to display or printing device 60.

Computer 50 is a combination of conventional elements such as amplifiers, threshold circuits, logic devices, etc. The computer thus performs the above-described arithmetic functions to obtain, in a simple manner, signals representative of the various color components of an original. The computer then further manipulates these signals in a known manner to obtain further composite signals representative of color masking.

The function of the computer and its components are known and well understood by the prior art and are not per se considered to be the instant invention.

Device 60 may take any suitable form of conventional print or display apparatus such as, for example, a color CRT, or a laser output scanner which prints sequentially corrected color separation images on a photoconductive drum.

It should therefore be apparent that the system described has capabilities extremely useful in the reproduction of color originals or the creation of an intermediate advantageous in multiple copy reproduction. The reproduction may be modified by manipulation of the electrical signals within computer 50. The masking characteristics of the overall system may further be controlled through manipulation of the signals and by inserting various color filters into the recorder input.

All of the lenses, filters, lamps, lasers, etc. used in the instant system are known in the art as exemplified by the incorporated patent and application.

The laser can be caused to scan the surface of the image recorder by any of the techniques known in the art. For example, the beam may be reflected from two mirrors in series one oscillating in a horizontal direction and one in a vertical direction. Alternatively, a single mirror may oscillate in one direction and simultaneously or step-wise moved in a direction 90° thereto.

When the face of the image recorder is being scanned, the phase image may decay to a point where it is no longer useful. FIG. 9 shows a structure which alleviates this problem. Adjacent to phase image 70, two controlled bands are positioned, one white band 71 and black band 72. The black band is optional. The video signals produced by the control bands are compared during an extension of the vertical scan to the maximum, or minimum, signals needed from the video signal amplifier, and a control signal will be fed into the amplifier gain control to maintain optimum dynamic range of its output regardless of the diffraction efficiency of the image recorder.

It will be understood that various other changes of the details, materials, steps, arrangements of parts and uses which have been herein described and illustrated in order to explain the nature of the invention will occur to and may be made by those skilled in the art, upon a reading of this disclosure, and such changes are intended to be included within the principles and scope of this invention.

For example, different embodiments may be devised which depend basically upon the same teachings as herein disclosed. Three image recorders may be used, one each for the red, green and blue images, and the three recorders scanned by the same or different lasers in register.

Also, for example, it is entirely within the skill of the art to employ color image recorders other than those specifically delineated herein.

As stated above, the signals from detectors positioned at selected locations in the diffraction pattern may be combined to form a particular desired composite signal. It may be further desirable, under certain circumstances, to monitor second or higher order diffracted light to add to or subtract from other signals in forming useful composite signals.

Although specific components and process steps have been stated in the above description of preferred embodiments of the invention, other suitable materials, proportions and process steps, as listed herein, may be used with satisfactory results and varying degrees of quality. In addition other materials which exist presently or may be discovered may be added to materials used herein to synergize, enhance or otherwise modify their properties.

What is claimed is:

1. A method of scanning a phase modulated image comprising the steps of:
   a. providing a phase modulated image;
   b. providing a lens means on-axis with the phase image one focal length thereof away from the phase image;
   c. providing a deflector means on-axis with said lens means and the phase image, also one focal length away from said lens means, but on the opposite side thereof from the phase image, said deflector means pivotally and movably mounted to provide a scan path of the surface of the phase image;

d. directing a beam of collimated light from an off-axis location onto said deflector means whereby as the deflector means controls the scan path, the focused beam light illuminates the phase image.

2. The method of claim 1 further including at least one light detector means positioned to monitor the light intensity of at least one diffracted order of light.

3. The method of claim 2 wherein said at least one detector means is positioned adjacent said deflector means and in the same plane thereof.

4. The method of claim 2 further, including a beam splitter in the path of said beam of collimated light between said deflector means and said lens means, and said at least one light detector means is located off-axis with said lens means, whereby part of the diffracted orders of light are directed away from the plane of said deflector means to said detector means.

5. The method of claim 4 further including a light intensity detector positioned to monitor the zero order, or reflected light.

6. The method of claim 3 wherein said at least one detector means comprises a light intensity detector for each of the first orders of diffracted light.

7. The method of claim 5 wherein said at least one detector means comprises a light intensity detector for each of the first orders of diffracted light.

8. The method of claim 6 wherein said phase modulated image is made by the steps of:
providing an imaging member comprising a layer of voltage or current-sensitive light modulating material overlying a layer of photoconductive material; and
exposing said imaging member to an imagewise pattern of activating electromagnetic radiation.

9. The method of claim 8 wherein said voltage or current-sensitive light modulating material comprises an elastomer material.

10. The method of claim 9 wherein said imaging member further includes a transparent conductive substrate upon which said photoconductive layer resides.

11. The method of claim 10 wherein said imaging member further includes a flexible conductive metallic layer overlying said light modulating layer.

12. The method of claim 1 wherein said phase moudulated image comprises a phase modulated color encoded image.

13. The method of claim 12 wherein said beam of collimated light is provided by a single substantially one color laser.

14. The method of claim 13 further including at least one light detector means positioned to monitor the light intensity of at least one diffracted order to light.

15. The method of claim 14 wherein said at least one detector means is positioned adjacent said deflector means and in the same plane thereof.

16. The method of claim 13 wherein said phase modulated color encoded image is made by the steps of:
providing an imaging member comprising a layer of voltage or current-sensitive light modulating material overlying a layer of photoconductive material; and
exposing said imaging member to an imagewise pattern of color encoded activating radiation.

17. The method of claim 16 wherein said imagewise pattern of color encoded radiation is provided by the steps of:
exposing said photoconductive layer to a color image modulated by a grating comprising at least two differently modulated colored sets of stripes, each of the stripes comprising alternating strips of colored and non-colored light transmitting areas.

18. The method of claim 17 wherein said at least two differently modulated colored sets of stripes are modulated by being arranged at different angular orientations.

19. The method of claim 17 wherein said at least two differently modulated colored sets of stripes are modulated by being arranged at different frequencies.

20. The method of claim 16 wherein said imaging member further comprises a color grating comprised of at least two differently modulated colored sets of stripes each of the stripes comprising alternating strips of colored and non-colored light transmitting areas, said grating being adjacent to said photoconductive layer opposite said voltage or current-sensitive layer, and said imagewise pattern of color encoded activating radiation is provided by the step of:
exposing said photoconductive layer to an imagewise pattern of activating radiation through said grating.

21. The method of claim 20 wherein said at least two differently modulated colored sets of stripes are modulated by being arranged at different angular orientations.

22. The method of claim 16 wherein said imagewise pattern of color encoded activating radiation is provided by the steps of:
providing, on said photoconductive layer of said imaging member, a fiber optic element and a color grating comprising at least two differently modulated colored sets of stripes, each of the stripes comprising alternating stripes of colored and non-colored light transmitting areas, said fiber optic element being arranged to optically carry an image of said color grating to a plane within the imaging member; and
exposing said imaging member to an imagewise pattern of activating radiation through said color grating.

23. The method of claim 22 wherein said at least two differently modulated colored sets of stripes are modulated by being arranged at different angular orientations.

24. The method of claim 23 wherein said imaging member further includes a transparent conductive substrate between said photoconductive layer and said fiber optic element.

25. The method of claim 24 wherein said imaging member further includes a flexible conductive metallic layer overlying said light modulating layer.

26. The method of claim 25 wherein said voltage or current-sensitive layer comprises an elastomer material.

27. The method of claim 26 further including the step of applying an electrical field across the photoconductive and elastomer layers between said flexible conductive metallic layer and said conductive substrate during said exposing step.

28. The method of claim 18 wherein said at least two differently sets of modulated colored sets of stripes comprise three sets of stripes.

29. The method of claim 28 wherein said three colored sets of stripes are not the same and are selected from the group consisting of red, green, blue, cyan, magenta and yellow.

30. The method of claim 29 wherein said three colored sets of stripes are cyan, magenta and yellow.

31. The method of claim 30 further including at least one light detector means positioned to monitor the light intensity of at least one diffracted order of light.

32. The method of claim 31 wherein said at least one light detector means comprises three light detector means positioned so that each monitors the light intensity of one diffracted order of light corresponding to said three colored sets of stripes.

33. The method of claim 31 wherein said three colored sets of stripes are arranged at angular intervals of 60°.

34. The method of claim 33 wherein said light detector means comprises light detectors positioned so that the intensity of each diffracted first order of light, including the crosstalk terms, may be selectively and simultaneously monitored.

35. The method of claim 34 wherein said imaging member further comprises a fiber optic element having said three colored sets of stripes thereon, said fiber optic element being arranged to optically carry an image of said three colored sets of stripes to a plane within the imaging member.

36. The method of claim 35 wherein said imaging member further includes a transparent conductive substrate between said photoconductive layer and said fiber optic element.

37. The method of claim 36 wherein said imaging member further includes a flexible conductive metallic layer overlying said light modulating layer.

38. The method of claim 37 wherein said voltage or current-sensitive layer comprises an elastomer material.

39. The method of claim 38 further including the step of applying an electrical field across the photoconductive and elastomer layers between said flexible conductive metallic layer and said conductive substrate during said exposing step.

40. The method of claim 39 further including electronic computation means electrically attached to said light detectors to manipulate the signals therefrom and produce output control signals representative of a masked color image.

41. The method of claim 40 further including an image reproduction means receiving said output control signals 42. The method of claim 39 wherein said image reproduction means comprises a color display.

* * * * *